Jan. 8, 1963 O. E. O. KUHBERG 3,072,755

TELEPHONE HEADPHONE ATTACHMENT

Filed July 27, 1961

INVENTOR

Olof E. O. Kuhberg

3,072,755
TELEPHONE HEADPHONE ATTACHMENT

Olaf E. O. Kuhberg, Ajax, Ontario, Canada (% Canadian Research & Development Foundation, 1434 Queen St. W., Toronto 3, Ontario, Canada)

Filed July 27, 1961, Ser. No. 127,376
5 Claims. (Cl. 179—146)

This invention relates to improvements in telephones and more particularly to improvements in telephone hand set attachments wherein a second receiver is utilized to convert a hand set to a head set at will.

It is common practice to utilize a telephone hand set attachment taking the form of a cradle which will support the hand set from the shoulder of the user. This method has the disadvantage that only one earphone is employed and any noise in the surrounding area is annoying to the user, making hearing extremely difficult. Furthermore, even though both hands are free, it is necessary to screw up the shoulder holding the phone and cradle and that particular arm is therefore of little use, especially if it should be necessary to stretch over a desk or sort through documents or the like.

It is an object of this invention to provide a telephone headphone attachment, in the following called headphone, which will enable the user to have both hands free to write messages, type or the like.

It is another object of this invention to provide a headphone which will allow the user to hear with both ears and exclude surrounding noise.

It is yet another object of this invention to provide a headphone which may also permit a telephone to which it is attached to be utilized as a conventional handset.

It is yet another object of this invention to provide a headphone which, when not required for use with its conventional handset, will be adapted to exclude any continuity of circuit to the auxiliary headphone.

It is yet another object of this invention to provide a headphone which is adjustable to any person having a head size within the normal range.

These and other objects and features of this invention will become apparent when taken in conjunction with the accompanying drawings in which.

Figures 1, 2:
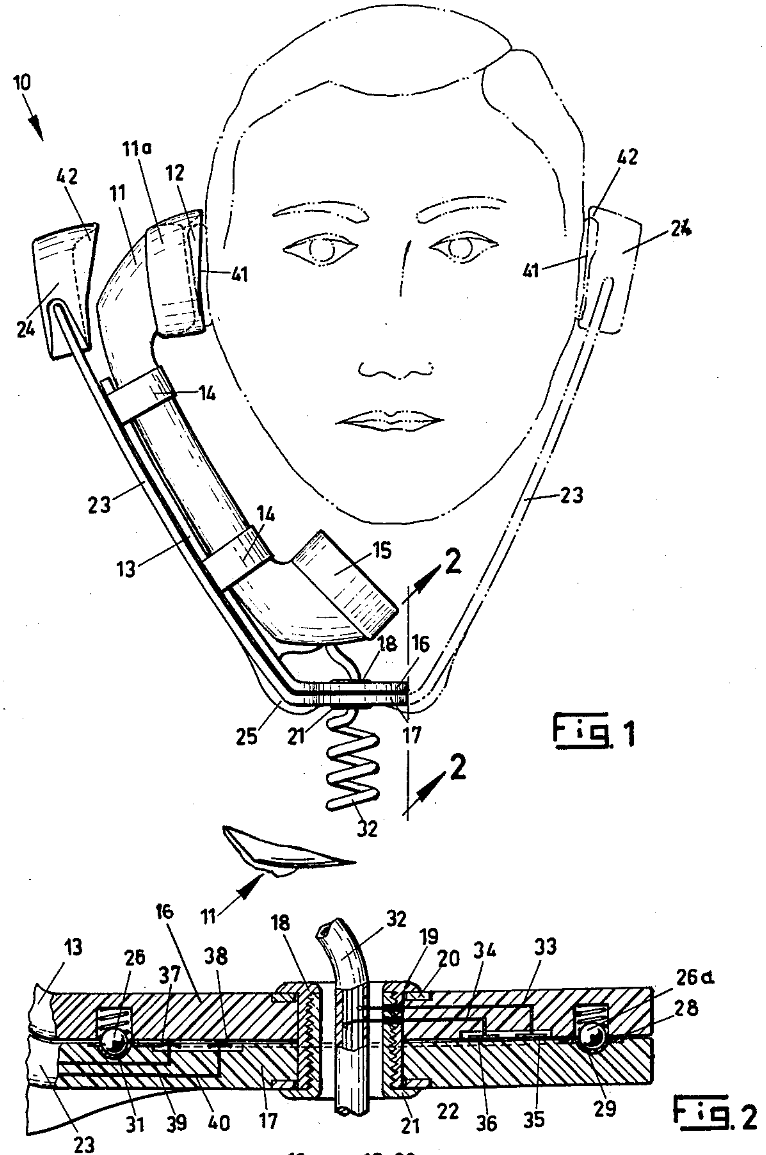
FIG. 1 is a front elevation of a headphone embodying the present invention, illustrating in phantom the position of the auxiliary receiver when in use.
FIG. 2 is a sectional side elevation of the swivel portion of the headphone illustrated in FIG. 1, taken on the line 2—2, showing particularly the contact displacement when the hand set receiver only is in use.

Referring to FIG. 1, a headphone assembly 10 includes a conventional telephone handset 11 having a resilient ear diaphragm 12 of soft plastic or the like, assembled thereon and supporting a fixed arm 13 firmly attached to outermost wall thereof by means of clips 14.

Arm 13 extends downwardly beyond the microphone portion 15 of handset 11 to terminate in a fixed disc 16 of dielectric material such as, for instance, high impact plastic. Disc 16 is adapted to lie in a substantially horizontal plane upon handset 11 being held in the vertical plane of the conventional operational position as illustrated.

Referring also to FIG. 2, a movable disc 17, similar in size and shape to fixed disc 16 is held in slidable, face to face contact therewith by means of a tubular centre shaft 18, having an upper flange 19 contiguous with a metal washer 20 embedded in the upper surface of disc 16 and a lower flange 21 in slidable contact with a metal washer 22 embedded in the lower surface of disc 17.

An elongated substantially rectangular framework 23 extends outwardly and upwardly from one side of movable disc 17 to terminate in an auxiliary earphone 24. Framework 23 is sprung longitudinally and in the "housed" position is adapted to lie along the outermost wall of handset 11 in spring loaded contact therewith. A reinforcing rib 25 extends from disc 17 to framework 23 to assist in the spring action and to permit framework 23 to be moved arcuately outwardly for approximately 30° in order to accommodate various head sizes.

In the "in use" position as shown in phantom in FIG. 1, framework 23 may be sprung outwardly, away from handset 11 and disc 17 thereafter rotated about shaft 18 to a location diametrically opposite to that of handset 11.

The correct positioning of framework 23 is accomplished by a spring loaded bolt 26 protruding from lower surface 27 of fixed disc 16 registering with an indentation 28 formed in a track 29 in the upper surface 30 of movable disc 17. A similar indentation 31 formed in track 29 diametrically opposite to indentation 28 is adapted to index disc 17 with ball 26 upon framework 23 being fully aligned with handset 11. A similar spring loaded ball 26*a* is diametrically oppositely located to ball 26 in disc 16 to provide for more positive indexing, but for clarity of description, the action of ball 26 only will be hereinafter described.

Referring to FIG. 2 specifically, a conventional telephone line cord 32 passes through shaft 18 to handset 11, the wiring to the earpiece however is tapped by two wires 33 and 34 which pass transversely through shaft 18 into fixed disc 16, passing therethrough to terminate in two leaf spring contacts 35 and 36 respectively in close, spaced apart relationship in lower surface 27 of disc 16.

Two similar contacts 37 and 38 are housed in upper surface 30, and, as shown in FIG. 2, upon indentation 31 registering with ball 26 and framework 23 being in juxtaposed relation with handset 11, contacts 37 and 38 are diametrically opposite to contacts 35 and 36 and at the same respective radii to the centres of their respective discs 16 and 17. Suitable wires 39 and 40 are connected to contacts 37 and 38 respectively and are embedded in disc 17, emerging from the side thereof to extend along frame 23 for connection with auxiliary earphone 24.

In the position as illustrated in FIG. 2 the circuit which includes wires 39 and 40 is open and earphone 24 is, therefore, non-operative.

Figure 3:
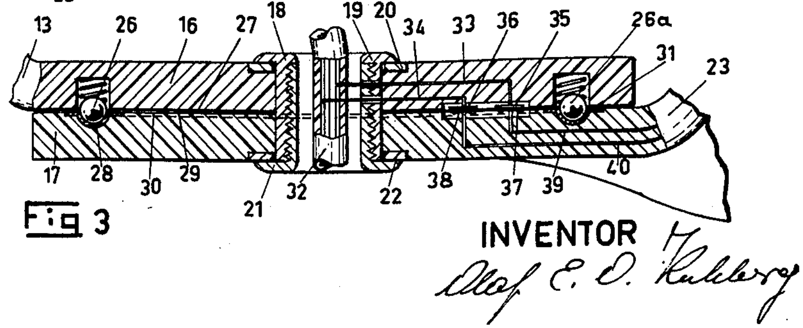
FIG. 3 is a sectional side elevation of the swivel portion of the headphone illustrated in FIG. 1, taken on the line 2—2 showing particularly the contact displacement when both the hand set receiver and the auxiliary receiver are in use.

FIG. 3 illustrates the mechanism of FIG. 2 upon disc 17 being rotated through 180° and indentation 28 registering with ball 26. In this instance, contacts 37 and 38 of disc 17 are adapted to register in electrical contact with contacts 35 and 36 respectively of disc 16. This places wires 39 and 40 and earphone 24 in a closed circuit with wires 33 and 34 through their respective contacts as described, said closed circuit being in parallel with that to the earpiece 11*a* of handset 11 through line cord 32, and therefore, live to receive messages simultaneously with handset 11.

The rotation of disc 17 as described also moves framework 23 through 180° so that auxiliary earphone 24 is diametrically opposite and facing inwardly towards earpiece 11*a* of handset 11.

It may be seen from the phantom illustration in FIG. 1 that in the above position, headphone 10 and handset 11 combine to act as a spring clip, earphones 11*a* and 24 firmly gripping the ears 41—41 of an operator with sufficient pressure to retain headphone assembly 10 and handset 11 in position without manual aid.

Diaphragm 12 mounted on earphone 11*a* and a similarly formed diaphragm 42, mounted on auxiliary earphone 24, substantially seal off ears 41—41 from external noises so that the operator may receive messages through said earphones undisturbed.

When not required for use, framework 23 and auxiliary earphone 24 may be returned to their juxtaposed positions to handset 11 by rotation of disc 17, whereafter handset 11 may be returned to its cradle in a conventional manner.

Thus handset 11 with headphone 10 attached, may be utilized in a conventional manner and should it be desirable to eliminate external noise or to leave both hands free or both, disc 17 may be rotated as described bringing auxiliary earphone into operational position and connected into the receiving circuit of handset 11 as described.

The general design of the individual parts of this invention may be varied according to the requirements in regards to manufacture and production thereof, while still remaining within the spirit and principle of the invention, without prejudicing the novelty thereof.

The embodiments of this invention in which an exclusive property or privilege is claimed are defined as follows:

1. A telephone headphone assembly adapted for attachment to a telephone handset; a telephone handset having a line cord containing an earphone circuit, a headphone assembly including auxiliary earphone means; a resilient framework supporting said auxiliary earphones; a fixed arm attached to said handset and rotatably supporting said framework; contact means operable by the rotation of said framework placing said auxiliary earphone in electrical circuit with said handset.

2. A telephone assembly as defined in claim 1 in which said contact means includes a fixed disc and a movable disc; said fixed disc carrying two fixed leaf contacts connected in parallel with said line cord earphone circuit of said handset; a movable disc carrying two moving leaf contacts, said auxiliary earphone being included therebetween in series electrical connection; said moving contacts being selectably connectable with said fixed contacts to place said auxiliary earphone in parallel electrical circuit with said line cord earphone circuit.

3. A telephone headphone assembly as defined in claim 2 in which one or more spring loaded balls in one of said discs are adapted to selectively register with indentations in the other of said discs for positive location of said fixed and moving contacts and said auxiliary earphone.

4. A telephone headphone assembly as defined in claim 2 including a flanged, centre shaft extending axially outwardly from said fixed disc and rotatably supporting said movable disc in coaxial, face to face relationship with said fixed disc.

5. A telephone headphone assembly adapted for attachment to a telephone handset; a telephone handset having a line cord containing an earphone circuit, a headphone assembly including an auxiliary earphone; a resilient framework supporting said auxiliary earphone; a fixed arm attached to said handset supporting a fixed disc; a flanged, tubular centre shaft extending axially outwardly from said fixed disc; a movable disc rotatably supported by said centre shaft in face to face relationship with said fixed disc; two spaced apart fixed leaf spring contacts in said fixed disc, each of said contacts being connected to a wire of said earphone circuit of said handset contained in the line cord thereof; said movable disc supporting said resilient framework and said auxiliary earphone; two spaced apart moving leaf spring contacts in said movable disc, said auxiliary earphone being included therebetween in series electrical connection; said moving contacts being selectably connectable with said fixed contacts to place said auxiliary earphones in parallel electrical circuit with said line cord earphone circuit; two, diametrically oppositely located spring loaded balls extending part way through a face of said fixed disc; the mating face of said movable disc having two indentations therein; registerable with said balls permitting two positive locations of said movable disc relative to said fixed disc; a first location wherein said auxiliary earphone and framework is juxtaposed with said handset and said moving contacts are diametrically opposed to said fixed contacts; and a second location wherein said moving contacts are in registration and electrical connection with said fixed contacts, and said auxiliary earphone and framework are substantially diametrically opposed to said handset.

References Cited in the file of this patent

FOREIGN PATENTS 425,107 Italy ---------------- Sept. 9, 1947